[72] Inventors Robert E. Lewis
 Palo Alto;
 Melvin D. Wright, San Jose; Philip E.
 Chandler, Redwood City, all of, Calif.
[21] Appl. No. 762,279
[22] Filed Sept. 16, 1968
[45] Patented Aug. 10, 1971
[73] Assignee Teledyne, Inc.
 Hawthorne, Calif.

[54] LARGE APERTURE LIQUID-FILLED LENS FOR PRECISION ARTWORK CAMERA
13 Claims, 6 Drawing Figs.
[52] U.S. Cl. ........................................ 350/179,
 350/190, 355/18
[51] Int. Cl. ........................................ G02b 3/12,
 G03b 27/00
[50] Field of Search............................... 350/179,
 180, 190

[56] References Cited
UNITED STATES PATENTS
| | | | |
|---|---|---|---|
| 504,890 | 9/1893 | Ohmart | 350/179 UX |
| 884,217 | 4/1908 | Schuessler | 350/295 |
| 2,300,251 | 10/1942 | Flint | 350/180 |
| 2,525,921 | 10/1950 | Madan et al. | 350/179 |
| 3,368,862 | 2/1968 | Dean | 350/179 X |
| 2,051,791 | 8/1936 | Luce | 350/179 X |

Primary Examiner—John K. Corbin
Attorney—Flehr, Hohbach, Test, Albritton & Herbert ABSTRACT: A large aperture lens of high optical quality consisting of a hollow framework forming spaced apertures bounded by optical grade clear, bendable, flat windows bent into simply curved shapes and mounted in spaced relation on the framework to form a vessel for containing a liquid having a suitable index of refraction. In one form of the invention the windows are curved on cylindrical surfaces having axes arranged at right angles to each other and have the same curvature. A window-mounting arrangement is also disclosed which avoids undesirable stress development. A precision artwork camera using a lens of the above type as a condenser is also disclosed.

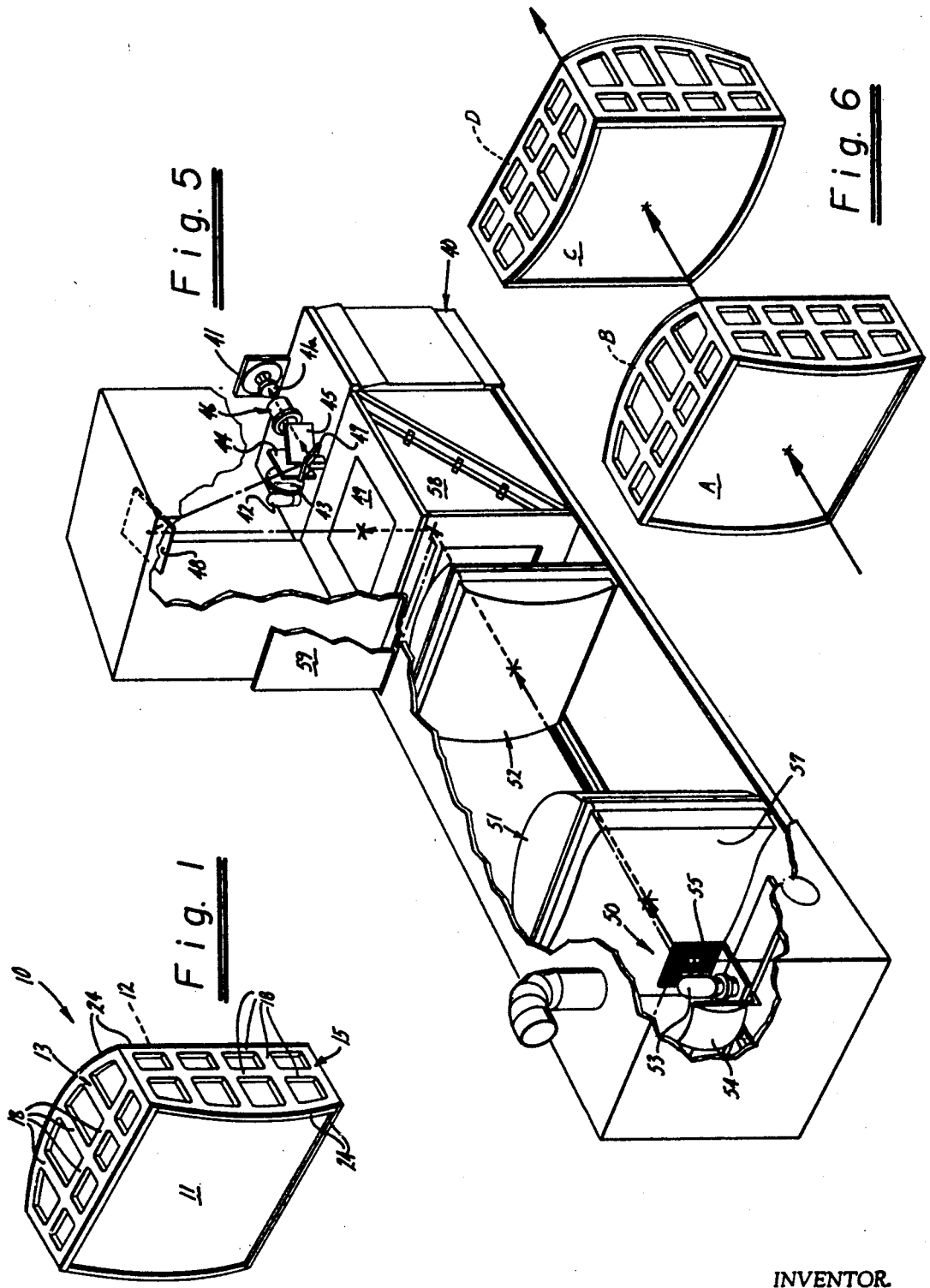

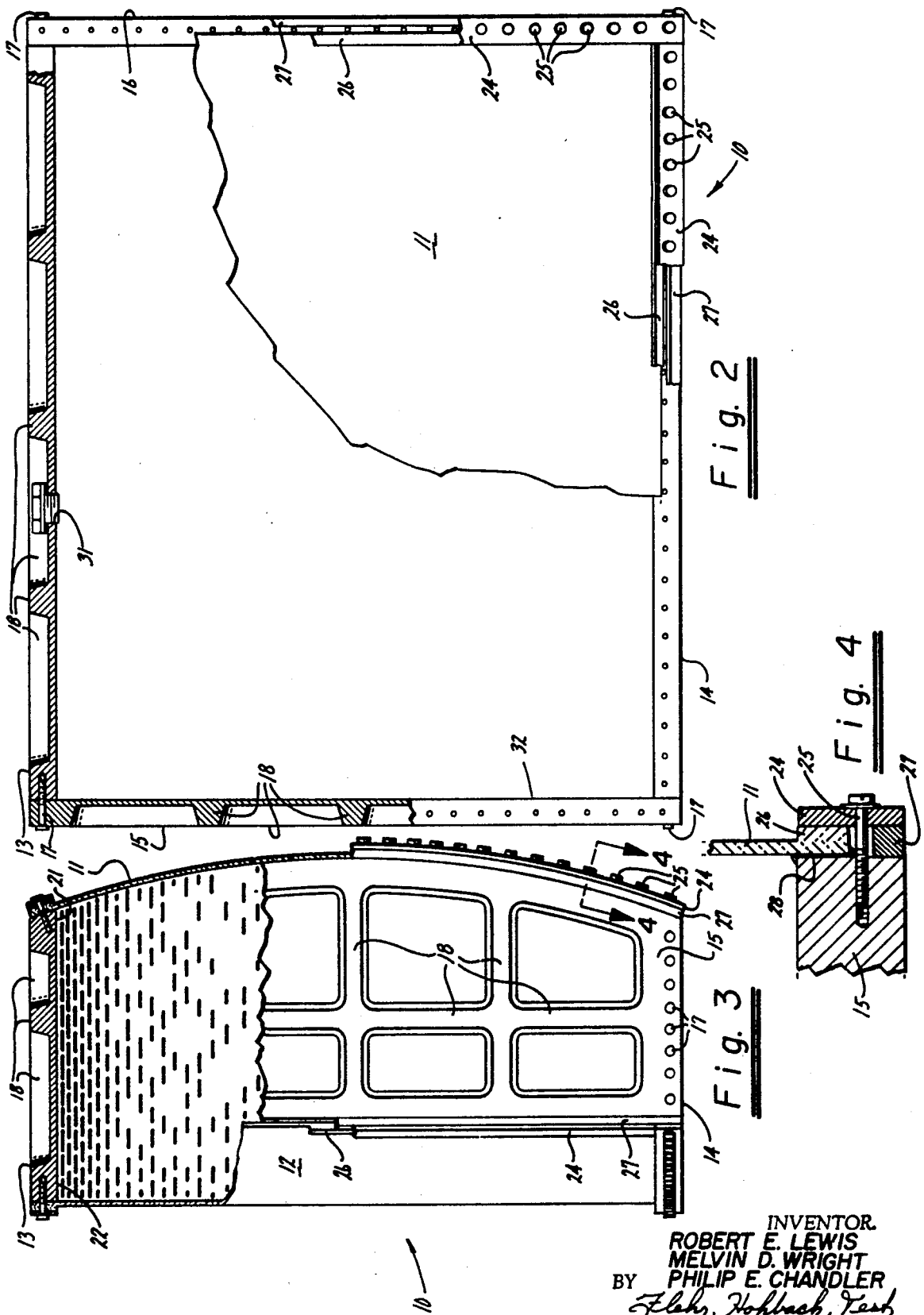

LARGE APERTURE LIQUID-FILLED LENS FOR PRECISION ARTWORK CAMERA

BACKGROUND OF THE INVENTION

This invention relates to lenses and more particularly to physically large lens structures such as large aperture condensing lenses and to a precision artwork camera using the same.

In certain applications, large aperture condensing lenses of high optical quality are required. For example, in the manufacture of circuits on semiconductors, a precision artwork camera having a large condensing lens is needed for imaging a specular light source through large scale artwork depicting a circuit pattern. The available lens types to serve this purpose have numerous limitations and disadvantages. The high resolving power and long working distance required in this application necessitates the use of a lens of large aperture, the size and expense of which become unreasonable for conventional lenses. Large lenses of solid glass require time-consuming and expensive annealing and optical polishing while lenses blown or drawn to the desired optical shape and liquid filled are of characteristically poor quality. Fresnel lenses tend to give nonuniform illumination with undesirable shadows which can only be eliminated by unduly increasing the lens to work distance. Different sources avoid lenses but require too much power and generate undesirable amounts of heat. Accordingly, there is a need for a new and improved large aperture lens and for precision artwork camera utilizing the same.

SUMMARY OF THE INVENTION AND OBJECTS

In general, it is an object of the present invention to provide a large aperture lens and precision artwork camera which will overcome the above-mentioned limitations and disadvantages.

Another object of the invention is to provide a lens of the above character which is comparatively simple to construct from optical grade, commonly available materials, including flat, bendable sheeting, a framework and suitable liquid.

Another object of the invention is to provide a large lens of adjustable power, high optical quality and relatively low cost.

Another object of the invention is to provide a lens of the above character which is adapted to a wide variety of applications such as radiation shielding.

Another object of the invention is to provide an optical system effective within preselected bandwidths of the electromagnetic spectrums.

Another object of the present invention is to provide a precision artwork camera using a lens of the above character.

In general, the above objects are achieved in a lens formed by bending optical grade, flat plastic sheets or windows onto a framework having precision-curved aperture surrounding surfaces which support the sheets on simply curved contours, such as cylindrical. The framework and the sheets are constructed and joined together in a liquidtight relationship to form a vessel containing a liquid transparent to the radiation at which the lens is to operate. The value of the index of refraction of the liquid is selected with regard to the curvature of the windows and the desired power of the lens. A precision artwork camera is provided using a specular light source and condenser lens of the above type to uniformly and brightly illuminate a large artwork copyboard.

As used herein, optically clear, as applied to the windows and liquid refers to the general condition of transparency of material to electromagnetic radiation of a given wavelength. And, optical includes wavelengths in the visible ultraviolet, infrared, and microwave since the invention is applicable to a wide range of wavelengths for suitably selected windows and liquid materials.

These and other objects and features of the invention will become apparent from the following detailed description of the invention when taken in conjunction with the accompanying drawings and claims.

DESCRIPTION OF THE DRAWINGS

FIG. 1 is an isometric view of a large aperture lens constructed in accordance with the invention.

FIG. 2 is a front elevational view, partially broken away, of the lens of FIG. 1.

FIG. 3 is a side elevational view, partially broken away, of the lens of FIG. 1.

FIG. 4 is a detailed cross-sectional view taken along the lines 4—4 of FIG. 3.

FIG. 5 is an isometric view, partly broken away, showing a precision artwork camera employing condensing lens constructions according to the invention.

FIG. 6 is an isometric sketch illustrating a balanced lens system constructed according to the invention.

DETAILED DESCRIPTION OF THE PREFERRED EMBODIMENTS

Referring to FIGURES 1 through 4, there is shown one form of large aperture lens 10 constructed in accordance with the invention which consists generally of a rigid framework on which are mounted bendable sheets of transparent material forming windows 11 and 12 which lie in spaced-apart relation on opposite sides of the framework. The framework consists of top and bottom plates 13 and 14 and sideplates 15 and 16 which are fastened together along their edges to form a generally rectangular, open, boxlike structure. The joints between the plates are sealed with a suitable gasketing material such as Teflon tape and are held fast with machine screws 17 so that the joints are liquidtight. A grid of intersecting ribs 18 is formed on the outside surfaces of the plates to supply added rigidity. The remaining edges of the plates are shaped, as by machining, to form first and second cylindrical window apertures 21, 22 communicating with each other through the framework. Each aperture is surrounded and defined by a precisely shaped supporting surface conforming to a simply curved contour to which the windows are bent into conformity.

In the present embodiment, the windows 11, 12 are made of an optical (typically aircraft) grade sheet of acrylic plastic (poly-methylmethacrylate). In other applications involving small bending radii or extremely large structures, it is contemplated that glass sheet could be satisfactorily bent to the desired contour. Also, other plastics having optical properties suitable for use in the particular spectral range of operation could be substituted for acrylic plastic.

Referring particularly to FIG. 4, there is shown in detail the arrangement for pressure clamping the window to the contoured aperture surfaces of the frame with a minimum of induced stressing to thereby avoid fractures caused by stress concentrations. The edges of the windows are free of holes or other irregularities and are urged into conformity against the framework by clamping bands 24 which overlap the edges of each window and extend beyond it and are there fastened to the frame with screws 25. A pressure distribution strip 26 is interposed between the bands and the window and surrounds the periphery of the window. The strip is made of the same material as the window, as for example acrylic plastic, so that it yields and deforms with about the same resistance as the window itself. A leveling shim 27 of a thickness equal to the combined thickness of the window and strip is provided between the other side of the clamping band and the surface of the framework to establish uniform contact and pressure between the band, strip and window. A suitable pressure flowable sealant such as a Teflon filament 28 is disposed between the window support surface and the window to provide a seal therebetween when pressure is applied. By using this clamping system, it is possible to attain a completely reliable seal between the framework and window while avoiding concentrations of stress in the window which would result in high-pressure cracks or fractures. A small gap can be provided between the end of one clamping band and the next adjacent band in order to provide for thermal expansion.

After the windows are assembled and sealed to the framework, the vessel formed thereby is filled with optically refractive liquid through a filling spout 31 in the top. The liquid can be selected from many suitable types, examples of which include mineral oil and aqueous salt solution (zinc chloride). More specifically, a mineral oil such as 1 White Mineral Oil (Russian Purgative Oil) or a solution of ZnCl in water are suitable. With the aqueous salt solution, the molar concentration can be varied to change its index of refraction which is useful if it is desired to change the power of the resulting lens while retaining the same geometry. By selection of suitable liquids, the effectiveness of the lens can be adjusted and optimized for different bandwidths within the electromagnetic spectrum including ultraviolet, visible, infrared, and microwave. By using dye additives particular frequencies can be selectively absorbed. Similarly, a radiation (X-ray, $\alpha$, $\beta$, $\gamma$ particles, etc.) absorber can be added either in solution with the liquid itself or by suspending a plate within the liquid and across the aperture to form a radiation shield. An example of the above would be a lead glass plate.

With the lens structure of the present invention, a reliable liquid-filled vessel is created from readily available materials with modest effort. The lens is of exceptionally high quality and lends itself to manufacture in very large sizes. Additionally, the curvature of the surfaces can take many forms provided the surfaces are simply curved, or noncompound. This restriction is required to avoid warping the sheets into forms they cannot assume without a stretching deformation.

More specifically, as used herein, the phrase simply curved includes all noncompound surfaces which can be generated by the continuous movement of a straight line and which contain no discontinuities in radius of curvature. This includes circularly cylindrical, conical, and other nonwarped surfaces which can be generated by movement of a straight line as, for example, a cylindric Schmidt corrector. Although the mounting surfaces are shown in FIGS. 1 through 4 as right circularly cylindric, it should be understood they can be deliberately designed to deviate somewhat from cylindrical. This is especially useful in order to compensate for the small distortions caused by the hydrostatic pressure of the contained liquid and is accomplished by forming the lower portions of the side surface at 32 with slightly less curvature; or, for vertically positioned lens surface, with a conical surface having a vertical axis. When so constructed, distortion is compensated out and an accurately cylindrical refraction surface is obtained.

By way of example, a large aperture lens constructed according to the invention had the following specification.

Aperture dimensions—36 inches x 48 inches
Framework plates—13—16
minimum thickness—one-half inch
maximum thickness of ribs—2 inches
material—aluminum
Windows and bond strips, poly(methylmethacrylate) thickness—one-fourth inch
Radius of curvature
1 $^a$ and 2 $^d$ surfaces—slightly acylindric, varying about 20 percent from a 5-foot radius of curvature.
Surfaces making 90° angle to each other.
Sealant—Teflon filament or tape.
Refractive liquid—white mineral oil.

By way of an example of the use of the lens structure of the present invention, reference is made to FIG. 5 of the drawings which shows a precision artwork camera employing a pair of such lenses as condensers. The camera consists generally of a boxlike framework and support table 40 having a wafer support 41 at one end for mounting a semiconductor wafer 41a or photographic plate. Means are provided for illuminating the wafer and projecting it onto the artwork for viewing and consists of a lamp 42, small condensing lens 43, filter 44, and a beam splitter 45, arranged in series with an objective lens system indicated at 46. Filter 44 is selected to block wavelengths which would expose photosensitive material on the wafer or plate, and is further selected to pass other wavelengths in the visible spectrum so as to permit the formation of a visible image of the wafer through the optics of the system. Light from the lamp 42 is directed by the beam splitter 45 through objective lens 46 onto the wafer from which it is reflected back through the objective lens 46 (and beam splitter 45) and redirected by a pair of mirrors 47 and 48 onto the top of a horizontal artwork surface of plane 49. Objective lens 46 is selected to form an image of the wafer or plate at the artwork surface. Mirrors 47 and 48 are first surface, optically flat reflective mirrors of high quality so that the image of the wafer appearing in the artwork surface is a precise, exact, high-quality image suitable for examining in detail and for the creation of artwork as will be explained. It is to be understood that many variations of the redirecting optics may be substituted for the above without departing from the teachings of the present invention. For example, mirror 47 can be eliminated and the optical axis of 41a—46 tilted to point directly toward mirror 48.

Means are provided for illuminating the artwork plane from the reverse side to expose the pattern thereon to the wafer, and consists of at least one large aperture lens for collecting light from a specular light source 50 and for directing it through the artwork. As shown, a pair of lenses 51, 52 are utilized in the present camera and serve to collect light received from a lamp 53 and reflector 54. A plurality of rods 55 of transparent material are disposed in front of the lamp and serve to diffuse the light and improve the uniformity of illumination. Each of the lenses 51, 52 is constructed in a manner similar to that previously described and includes a framework supporting simply curved bendable sheets in spaced- apart relation on simply curved contours to form vessels for containing a liquid to thereby form liquid lenses. The large aperture lenses also illustrate variations of the type which would find use in accordance with the present invention, such as the cylindrical Schmidt correction surface 57 of the lens 51. Lens 52 utilizes vertical and horizontally oriented cylindrical surface contours similar to that previously described in connection with the lens structure of FIG. 1. A suitable mirror 58 deflects the light from lens 52 upwardly through artwork surface 49.

In operation, light from the lamp 42 illuminates the wafer which is then imaged by objective lens 46 onto the artwork surface 49. The artwork surface may contain any sort of media suitable for establishing a pattern which bears a relation to the artwork. These media can be in the form of tape which is laid down or can be a layer of tape from which strips are cut to indicate the location of circuit wiring or the like. After the media are modified to establish the pattern that it is desired to print onto the object, the lamp 42 is shut off and the specular lamp 53 is turned on, having been previously off. For convenience, the large lamp may be left on and a shutter 59 utilized to exclude its light from the remainder of the system until desired. In any event, light is allowed to pass from the specular light source through the liquid lenses, is reflected by mirror 58 onto the reverse side of the artwork plane through which it passes and is imaged by the folding mirrors 47, 48 and objective lens 46 onto the wafer or photosensitive plate. By utilizing the liquid lenses of the present invention, high power specular light sources can be utilized and the condensing lenses of the present invention cause this light to uniformly illuminate a large artwork surface so that a high quality rapid exposure of the photosensitive surface of a wafer or plate at 41 can be made without requiring any alignment motion of the wafer or plate.

In the system illustrated in FIG. 5, the liquid-filled optics are designed with an anamorphic property which provides for less magnification of the vertical height of the lamp 53 than the width. The height is condensed by the horizontal axis surface of lens 52 at near unity magnification whereas the width is magnified by the three vertical power surfaces (thus providing greater magnification) to fill the pupil of objective 46 and obtain greater light-gathering efficiency from 53. In other designs, this anamorphic property can be balanced out by using a pair of symmetrical lenses of the type shown in FIG. 6 in which the outer surfaces A,D facing away from each other have parallel axes at right angles to the axes of the inner surfaces B,C which face each other. Thus, inherently anamorphic cylindrical lenses constructed in accordance with the present invention can be coupled together as a matched, symmetrical pair (as shown) to achieve a balanced operation or equal magnification as with ordinary spherical lenses.

The lens of the present invention is useful in a wide variety of applications, many of which will occur to those skilled in the art to which this subject pertains. For example, vessel of the lens can easily be arranged into two compartments separated by a transparent wall which can be a lead glass to provide radiation shielding. By providing a complete liquid barrier between the compartments, it is possible to construct combination lenses of different, complementary refractive index, analogous to the flint-crown combination in achromatized glass lenses. Accordingly, it will be appreciated that many modifications and widely differing embodiments of the invention will suggest themselves from this invention and the scope hereof is not to be limited by the specific embodiments disclosed herein but is to be interpreted in the light of the appended claims.

We claim:

1. In a liquid-filled lens, a rigid hollow framework having spaced window apertures defining an optical passageway therethrough, said framework including means forming a closed line path surrounding each aperture to form an outwardly facing peripheral support surface lying on a simply curved contour, means forming first and second substantially nonstretchable planar sheets formed or optically clear material and having sufficient flexibility that they can be bent into conformity with a respective contoured support surface, means attached to said framework for supporting said first and second sheets over the respective supporting surfaces to form said framework and said first and second sheets into a liquid-tight vessel whereby the optical curvature of each sheet is substantially defined by said respective support surface, said sheets being continuous to outer peripheral edges lying in contact with a respective one of said support surfaces, said means for supporting said sheets includes clamping band means which overlaps in a continuous manner all said peripheral edges and an optically clear, refractive liquid disposed in said framework between said sheets.

2. A lens as in claim 1 wherein said first and second contours lie on cylinders having axes arranged at right angles to each other.

3. A lens as in claim 1 wherein said optically clear sheets are formed of acrylic plastic.

4. A lens structure as in claim 3 wherein said acrylic plastic is poly(methylmethacrylate).

5. A lens as in claim 1 wherein said liquid is an optically clear mineral oil.

6. A lens as in claim 1 wherein said liquid is an aqueous solution of a salt.

7. A lens as in claim 6 wherein said salt is zinc chloride.

8. A lens as in claim 1 further including a stress distribution strip interposed between the clamping band and the edge, and a leveling shim interposed between the other side of the band and the support surface.

9. A lens as in claim 1 further including a pressure sealant disposed between the support surface and the facing surface of the sheet.

10. A lens as in claim 1 wherein said first and second cylindrical contours lie on cylinders having axes arranged parallel to each other.

11. A lens as in claim 1 wherein the contours form a cone on at least one surface.

12. A lens as in claim 1 wherein said liquid includes an additive to define the bands of radiation passage therethrough.

13. A lens as in claim 1 wherein the lens surface sheet about a horizontal axis is vertically asymmetrical.